United States Patent Office 2,971,932
Patented Feb. 14, 1961

---

2,971,932

OIL-MODIFIED ALKYD COMPOSITION WITH HALOGENATED COAL ACIDS

Herbert B. Rickert, Midland, Mich., assignor to The Dow Chemical Company, Midland, Mich., a corporation of Delaware No Drawing. Filed Sept. 19, 1957, Ser. No. 684,839

14 Claims. (Cl. 260—22)

Oil-modified alkyd compositions are complex polyesters that are comprised of the reaction products or adducts of mixtures of polybasic organic acids, polyhydric alcohols and monobasic unsaturated fatty acids. In such compositions, the chemically combined fatty acids constituents act as a drying agent for the liquid polyester product by the mechanism of addition polymerization into which types of reaction the unsaturated bonds of the fatty acids are capable of entering. Besides such function, the double bonds of the fatty acids may be made to copolymerize with styrene and other ethylenically unsaturated monomers to produce diverse types of compositions for various purposes, in the event that such varieties of further reacted products should be desired.

The most common examples of oil-modified alkyds are the commercially available glycerol-phthalic anhydride polyesters that have been modified with an unsaturated fatty acid (or its glyceride) such as linseed oil, soya bean oil or the like. The trihydric nature of the glycerol in such a composition permits accomplishment of the cross-linking that is needed to form a three dimensional polymer of the desired type. An analogous type of cross-linking can also be achieved when a combination of tribasic acid and a glycol is used. In the last mentioned instances, the desired three dimensional cross-linking of the polyester results from the polybasicity of the acid.

Besides other uses, many of the oil-modified alkyds may comprise or furnish an excellent base for surface coatings of various types (including varnish-like and pigmented paint-like formulations) that form hard, fast-drying, solvent-resistant and scuff-proof films or protective coated layers. Many of the oil-modified alkyds that are available, however, including certain of those that are commonly employed, are relatively expensive materials.

The chief aim and concern of the present invention is to provide, on a more economical basis, new, useful and highly satisfactory oil-modified alkyds derived from the halogenated products of certain polycarboxylic aromatic organic acids; fatty acids and polyhydroxy compounds, which alkyds may be utilized in any of the capacities generally fulfilled by the conventional alkyds and are especially adapted for application and utilization in surface coatings that have properties and characteristics which are at least commensurate, if not superior, to known analogous materials. The oil-modified alkyds of the present invention are comprised of (C) the chlorine substituted products of the polycarboxylic organic acid mixtures that are obtained from the oxidation of coal and the like carbonaceous materials, which are frequently characterized as being coal acids, the chlorinated products of which are hereinafter referred to as "chlorinated coal acids"; (B) unsaturated long chain fatty acids mixtures; and (A) normally liquid polyhydroxy compounds which may be classified as being higher glycols and are selected from the group consisting of normally liquid polyethylene glycols which contain at least three ethylene oxide units per molecule or may be said to be the products of condensation of at least three moles of ethylene oxide per mole of polyglycol product and which, in other words, are comprised of molecules that have a chain length of at least 10 atoms, normally liquid polypropylene glycols which contain at least two condensed propylene oxide units per molecule; normally liquid glycols and polyglycols which contain at least 4 carbon atoms (advantageously 4 to 8 carbon atoms) and at least one secondary hydroxyl group per molecule when less than 6 carbon atoms are present therein, and mixtures thereof. Representative of the polyhydroxy compounds that may be utilized in the compositions of the present invention are triethylene glycol; tetraethylene glycol; dipropylene glycol; tripropylene glycol; 1,2-butylene glycol; 1,3-butylene glycol; 1,2-pentylene glycol; 1,5-pentanediol; 1,6-hexylene glycol; 1,7-heptylene glycol; 1,8-octylene glycol and normally liquid equivalent higher analogs thereof including normally liquid condensation products of ethylene oxide having molecular weights as high as about 2000 and normally liquid condensation products of propylene oxide having molecular weights up to about 750 or so. The chlorinated coal acids that are employed may advantageously contain at least about 0.5 up to about 35 percent by weight of combined chlorine. More advantageously, they are comprised of at least about 10 percent, preferably at least about 17 percent, by weight of combined chlorine.

The oil-modified alkyds of the present invention may be conveniently prepared or obtained by reacting the halogenated coal acids, the glycol and the fatty acids mixtures at an elevated temperature, advantageously in the presence of a solvent vehicle, until the desired polyester reaction product is obtained. The solvent that is employd for such formational purpose may be selected as one that is capable of simultaneous function as a vehicle for the alkyd reaction product in surface coating compositions comprised thereof. The oil-modified alkyd compositions of the present invention are generally relatively dark colored materials that provide excellent surface coatings, invariably of a light yellow to brown color, which may be applied and air-dried or baked on after their application by whatever manner of drying may be best suited for the purpose at hand in individual instances. In addition to such applications, the oil-modified alkyd compositions of the present invention are also capable of being used frequently as thermosetting curable resins or as intermediates that are adapted to being further modified to form other beneficial products.

The oil-modified alkyd compositions of the present invention may advantageously be comprised of (or formed by the reaction between) from about 2.0 to 3.0 equivalents of the polyhydroxy compound, from about 1.9 to 0.2 equivalents of the chlorinated coal acids and from about 0.1 to 1.8 equivalents of the unsaturated fatty acids mixture. More advantageously, they may be comprised of from about 2.1 to 2.3 equivalents of the polyhydroxide compound, from about 1.8 to 0.8 equivalents of the chlorinated coal acids and from about 0.3 to 1.2 equivalents of the fatty acids mixture. It is generally preferable and frequently a necessity, to utilize at least a stoichiometric quantity of the glycol constituent in the preparation of the present compositions with respect to the quantity of the total acidic constituents being reacted. The compositions which may be obtained by proper practice of the present invention are homogeneous mixtures having the indicated utilities that oftentimes may be prepared so as to have an extremely low acid number less than, say, 10 or so. They are soluble in a wide variety of solvents, including benzene, toluene, xylene, xylol, dioxane, methyl ethyl ketone, methyl isobutyl ketone, various relatively fugacious aromatic and aliphatic hydrocarbon solvents, and the like or equivalent materials.

If desired, between about 2 and 5 percent by weight of the total charge of reacting ingredients may be comprised of maleic anhydride. The utilization of such an ingredient may beneficially serve to promote more rapid esterification during the reaction and tend to secure lighter coloration in the resulting product. Also, if desired, from 0.1 to 0.6 equivalent of the polyhydroxy compound constituent may consist of a polyhydroxy material which, in and of itself, is not adapted to provide homogeneous and otherwise suitable oil-modified alkyds of the indicated type in the practice of the invention. Included among such non-operable polyhydroxy compounds which may be used in the indicated minor proportions with those that may be suitably employed in the practice of the invention may be mentioned those selected from the group of non-operable glycols which consists of glycerine, ethylene glycol, diethylene glycol, propylene glycol and 1,5-pentanediol.

The exact ranges of ingredients that are employed in various circumstances in the practice of the present invention is somewhat dependent on the characteristics of the specific constituents being employed and the proportional relationship that must be effected between them in order to obtain a product having the desired homogeneity. In most cases, as has been indicated, a homogeneous product may be prepared when about equal equivalent weight proportions of the glycol and the mixture of chlorinated coal acids and fatty acids mixture is obtained. Ordinarily, it is desirable to use about a 10 percent increase in the glycol constituent in the preparation of the alkyd composition of the present invention. Such an excess of glycol not only facilitates the preparation of a homogeneous system under most circumstances but also seems to increase the rate of esterification during the reaction in which the alkyd compositions are being prepared. The combined halogen content of the halogenated coal acids constituent also influences the ease with which homogeneity may be achieved in the alkyd product. Ordinarily, halogenated coal acids having greater proportions of combined halogen are found to more readily contribute to the attainment of a homogeneous product. The average functionality of the total charge also has an effect on the characteristics of the product being attained. For example, in order to obtain an oil-modified alkyd product having a low acid number, the average functionality of the total charge should not be much greater than about 2. In such cases, therefore, a relatively high proportion of the monobasic fatty acid ingredient may advantageously be employed. If, on the other hand, products with high acid numbers are desired for such applications and utilizations as thermosetting resins, then much smaller amounts of the monofunctional fatty acids may be used without incurring gelation in the reaction product.

As is indicated in the foregoing, the characteristics of the alkyd compositions which may be obtained depend to a great extent on the nature of the constituents employed for their preparation. The viscosity of the alkyd product, for example, is generally proportional to the amount of chlorinated coal acids that have been incorporated in the liquid phase of the alkyd. Likewise, the hardness of a film comprised of an alkyd composition in accordance with the present invention is dependent on the amount of cross-linking that may be obtained in the product. And, like the viscosity of the alkyd product, film hardness is a function of the amount of halogenated coal acids incorporated in the composition. Besides the nature of the ingredients employed for its manufacture, the solubility of an alkyd product prepared in accordance with the present invention is also dependent on the extent of esterification that has been accomplished therein. Ordinarily, and in general terms, if the esterification is up to one-third complete, the alkyd product will be soluble in such polar organic solvents as ethanol and acetone. If the degree of esterification is between one-third and two-thirds, the product will usually be soluble in both polar and non-polar organic solvents. More highly esterified products, such as those obtained in reactions that are up to 95 percent complete, are generally soluble in non-polar organic solvents, including the aromatic and aliphatic hydrocarbons.

The oil-modified alkyds of the present invention may be formed readily in the indicated manner with conventional apparatus using reaction temperatures that are between about 100 and 300° C. Advantageously the greatest proportion of the reaction may be conducted at temperatures in the range from about 150 to 250° C. Other temperatures may also be found operable and either subatmospheric, atmospheric, or superatmospheric pressures may be utilized for conducting the reaction. If desired, an acid catalyst such as sulfuric acid or its organic and inorganic equivalents for such esterification purposes may be optionaly employed to facilitate the reaction. A very convenient form of catalyst for utilization in the preparation of the oil-modified alkyd compositions of the present invention is the acid varieties of certain ion-exchanging resins, including sulfonated polystyrene resins in free acid form and the like (such as that which is available from The Dow Chemical Company under the trade-designation "Dowex 50"). This form of acid-resin catalyst may be easily removed from the reaction mass by filtration upon termination of the reaction.

Whether or not a catalyst is employed, the reaction easily proceeds at a moderate rate at the lower end of the indicated temperature range and at a much faster rate at the higher end thereof. At higher temperatures, greater conversions of the reactant materials are usually found to be experienced within about the same period of reaction. Without use of a catalyst, a somewhat slower reaction may be experienced. In general, the first stages of esterification, regardless of the conditions under which it is conducted, are found to be relatively rapid and the latter stages relatively slow. The reaction rates that are experienced in the preparation of the oil-modified alkyds of the present invention are ordinarily similar to those which are experienced in the performance of other alkyd-forming reactions. The precise rate of reaction in given instances is usually found to be influenced by the rate of increase in viscosity, temperature, concentration and rate of stirring. If desired, the reaction may also be facilitated by sparging the reaction mass with an inert gas such as nitrogen.

The chlorinated coal acids that are employed to prepare the excellent, yet relatively inexpensive, alkyd compositions of the present invention have been described in the copending application of Herbert B. Rickert for "Halogenated Coal Acids" having Serial No. 684,838 which which was filed on September 19, 1957 now U.S. Patent No. 2,929,838. Such halogenated coal acids may be prepared from chlorine and free coal acids. The halogenated products may have any desired combined chlorine content within the above mentioned limits.

As disclosed in the referred-to copending application, chlorinated coal acids may be obtained by dissolving the free coal acids in water so that the resulting aqueous solution has a concentration between about 5 and 40 percent by weight (preferably between about 10 and 25 percent by weight); then subjecting the coal acids in aqueous solution to the action of free chlorine at a temperature from about 20 to 95° C. (advantageously, not in excess of 60° C.) while maintaining the reaction mass at a pH in the range from about 3 to 9 (beneficially in the acidic range from about 4 to 7) until the desired content of combined halogen has been obtained in the halogenated coal acids product. Most advantageously, the aqueous solution of the free coal acids may be neutralized with an alkali metal hydroxide (such as sodium hydroxide) prior to halogenation so that initially the solution has a neutral or slightly alkaline pH of about 7 or so and the incipient halogenation is accomplished on the dissolved coal acids in an alkali metal salt form. The halogenated coal acids may be recovered in any desired manner from the reaction mass subsequent to their halogenation after the reaction mass has been acidified to a pH of 1 or so. Conveniently the halogenated coal acids product may be removed from the acidified reaction mass by solvent extraction techniques, using such solvents as methyl ethyl ketone and the like for the purpose. The halogenated coal acids are then isolated from solution in the extracting solvent by conventional distillation or stripping techniques.

Any desired content of combined halogen up to nearly the upper theoretical limit may be effected in the foregoing manner. When chlorinated coal acids are involved, the halogenated product may advantageously contain up to about 35 percent by weight, more advantageously from about 10 to 30 percent, of combined halogen, based on the weight of the composition. The time that is required to halogenate the coal acids to a desired combined halogen content varies with the temperature that is employed, the pH that is maintained in the solution, the quantity of the halogenating agent that is utilized, and, as is apparent, the content of combined halogen that is desired to be finally obtained in the substituted product. When the reaction is conducted at temperatures lower than those in the indicated ranges, it may be found to proceed at a slower rate than is desirable. At temperatures higher than those indicated, an intolerably high proportion of the coal acids may be found to be destroyed. In this connection, even at temperatures between 60 and 95° C., greater destruction of the coal acids than is desirable may be encountered. Hence, the preferred indicated lower temperature range may beneficially be utilized for conducting the reaction. If the solution being halogenated is maintained at a pH that is either too high or too low, the rate of halogenation is generally found to be slower than required for practical operations.

Although solutions of the coal acids that are more dilute than 5 percent by weight may be halogenated, the volumetric efficiency of the reaction is undesirably lower at such low concentrations. At starting concentrations of the dissolved free coal acids higher than those indicated, difficulty may be encountered with precipitation of the acids at the commencement of the reaction. For this reason, it is preferred to operate with aqueous solutions which are prepared so as to have concentrations of the dissolved free coal acids that are not greatly in excess of about 25 percent by weight.

The chlorinated coal acids products are generally water soluble materials that also have better solubility in various organic materials (such as mixtures of glycols, and fatty acids) than do the unmodified free coal acids. They are generally hygroscopic, yellowish to brown colored powders having apparent bulk densities less than one gram per cubic centimeter. They are found to be soluble in water, acetone and methanol; partly soluble in ethyl acetate; and insoluble in benzene, petroleum ether and carbon tetrachloride. The molecular weight of the halogenated coal acids obviously depends upon that of the starting material and the extent of halogenation involved. Their average equivalent weight is generally somewhat higher than that of the free coal acids. The substitution of the halogen is believed to occur on both the nucleus and the carboxylic substituents of the coal acids molecules. Frequently about commensurate degrees of nuclear and side chain halogenation are obtained in the products of the present invention. In addition to many other uses, the chlorinated coal acid products have marked biological activity and are found to have excellent effectiveness as bactericides and fungicides.

The coal acids whose halogenated products are used in the practice of the invention may be identical with or similar to those which may be obtained by the oxidation with gaseous oxygen, which may be contained in air, of an aqueous alkaline slurry of a finely divided carbonaceous material selected from the group consisting of coal and coke that has been obtained by the carbonization of coal at temperatures beneath about 700° C. Coal acids that have been obtained by the nitric acid oxidation of suitable carbonaceous materials are also generally satisfactory, as are equivalent synthetic mixtures which may, if desired, be provided. Such coals that are of the varieties known as anthracite, bituminous, subbituminous and lignite and other low grade coals are generally suitable for production of coal acids. Satisfactory cokes are those produced according to conventional techniques from coal at a temperature beneath about 700° C. The utilization of higher coking temperatures frequently causes the cokes that are obtained to be graphite and rendered unsuitable for conversion to coal acids in satisfactory yields. A suitable method for the preparation of coal acids products may be in accordance with that which has been described in United States Letters Patent No. 2,516,640.

The free coal acid product is a hygroscopic, usually yellowish, essentially water soluble material. It is believed to be substantially comprised of various aromatic polycarboxylic acids. The average molecular weight of the coal acids that are ordinarily obtained (as indicated, for example, by means of boiling point elevations) is frequently in the neighborhood of 250–270 or so; seldom being less than 200 or more than 300. Their average equivalent weight is generally about 80; usually being more than 70 and rarely more than 90. They ordinarily appear to have an average of about 2.5 to 5 carboxyl groups per molecule with an apparent average of about 3 to 4 being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids prepared in the described fashion have been found to consist of methylnaphthalene, benzene, biphenyl, naphthalene, phenanthrene, benzophenone and various alkyl benzene, including toluene, nuclei. As might be expected, the chlorinated coal acids are a chemical commodity which, besides other of their desirable features and aptitudes, have the general attractiveness of low cost in their favor.

Practically any of the conventionally employed, commercially available mixtures of unsaturated "drying oil" fatty acids may be utilized in the practice of the present invention. Such materials, according to common concepts, generally contain mixtures of various unsaturated drying oil fatty acids that may have from about 12 to 22 carbon atoms in their molecules. The ordinarily encountered fatty acids mixtures that may be employed with especial benefit in the practice of the present invention include tall oil fatty acids, linseed oil fatty acids and soya bean oil fatty acids. Of course, blends of such fatty acids mixtures may also be utilized, oftentimes with decided benfit for purposes of obtaining products with unique and individualized properties and characteristics. In this connection, it is generally undesirable in the practice of the invention to use a substantially pure, unmixed, single unsaturated fatty acid for preparation of the alkyd products.

Use of such material commonly is disadvantageous and results in markedly inferior and dissatisfactory products as compared to the alkyd compositions obtainable with the conventional fatty acids mixtures.

As will be recognized by those who are skilled in the art, the drying characteristics of the chlorinated coal acid alkyds of the present invention are strongly dependent upon the precise nature of the specific fatty acids mixture constituent that is utilized for their preparation. Air-drying films of chlorinated coal acid alkyds can generally be obtained if fatty acids mixtures of sufficient unsaturation are used. Thus, compositions that have been prepared with linseed oil fatty acids are generally capable of producing films which can be completely air-dried in about 24 hours or less. On the other hand, tall oil and the like fatty acids mixtures usually produce alkyd products which are best dried when baked on or over the surface to which they are applied or which may be more advantageously utilized as thermosetting resins for binders and the like applications. Of course, conventional "driers" such as lead and cobalt naphthenates and the like may advantageously be utilized in the compositions of the invention to ameliorate their drying characteristics.

When the oil-modified alkyds of the present invention are provided in a solvent base, it is usually advantageous (especially for surface coating purposes) for the solvent-containing composition to be made up with between about 50 and 75 percent or so by weight of total resinous solids, based on the weight of the total composition. As mentioned in the foregoing, many paint-like coatings may also be prepared from the oil-modified alkyd compositions of the invention, if such products happen to be desired, by incorporating therein conventional quantities of pigments, fillers, extenders and the like, particularly when the alkyds have been formulated in and with a solvent vehicle.

The invention is further illustrated by the following examples wherein, unless otherwise indicated, all parts and percentages are to be taken by weight.

EXAMPLE 1

Into a reaction vessel there was charged the following ingredients:

8 grams halogenated coal acids
7.2 grams triethylene glycol
10.3 grams of tall oil fatty acids The halogenated coal acids that were employed had a combined chlorine content of about 28.2 percent. They had been prepared by chlorinating free coal acids (according to the procedure set forth in the referred-to copending application) that had an average molecular weight of about 284, an average apparent weight of about 84.6, an average functionality (or number of car boxylic acid groups per molecule) of about 3.36 and a carbon-to-hydrogen ratio of about 1.46; being comprised of about 54.36 percent of carbon, 3.10 percent hydrogen, 0.52 percent nitrogen and 0.16 percent sulfur.

The tall oil fatty acids that were employed were obtained from the Arizona Chemical Company under the trade-designation "Actinol FA-2." Their analysis was as follows:

Fatty acids_____percent__ 96.8
   Linoleic acids in fatty acids_____percent__ 48
   Oleic acids in fatty acids_____percent__ 50
   Saturated acids in fatty acids_____percent__ 2
Rosin acids_____percent__ 1
Unsaponifiable material_____percent__ 2.2
Acid number_____ 194
Iodine number_____ 130
Gardner color number_____ 6+
Gardner viscosity_____ A
Specific gravity (25/25° C.)_____ 0.9

The charged ingredients were gradually heated in the vessel over a period of 90 minutes until a temperature of about 250° C. was attained. At the end of this period, the reaction mass was permitted to cool. The liquid resinous product had an acid number of about 12.4, indicating that about 12.4 milligrams of potassium hydroxide were required for neutralization of each gram of the alkyd. A 5 percent solution of the resinous product is benzene had a Gardner color of about 11. The Gardner viscosity of the liquid alkyd product was about W. The liquid resin product was cast as a 2 mil film on a glass plate which was baked to a tack-free condition within a five hour period at 125° C. It was found to have a Sward hardness of about 3.

When the foregoing procedure was identically repeated, excepting to use a chlorinated coal acids containing about 1.8 percent of combined chlorine, a heterogeneous product was formed containing a gel and an oil phase and having about 81 percent of precipitate. When 13.8 percent chlorinated coal acids were used in the same manner, a heterogeneous product with 21 percent precipitate was formed. The latter two experiments indicate an increasing oil-solubility that may be obtained with coal acids having increased amounts of combined halogen.

EXAMPLE 2

Following the procedure of Example 1, a series of products were prepared from tall oil fatty acids (TOFA), triethylene glycol (TEG), and 13.8 percent chlorinated coal acids (ClCA). The compositions of each of the reaction products that were prepared and the results obtained are set forth in the following tabulation.

*Table 1*

| Sample | Constituents | | | Reaction Product | Percent Precipitate in Reaction Product | Temperature of Homogeneity | Percent of excess Equivalents of of Glycol Used | Gardner Viscosity of Product |
|---|---|---|---|---|---|---|---|---|
| | Parts TOFA | Parts TEG | Parts ClCA | | | | | |
| "A" | 3.3 | 1.0 | 1.0 | Precipitate plus oil. | 21 | None | −23 | H |
| "B" | 3.4 | 1.4 | 1.0 | _____do_____ | 6 | _____do_____ | −7 | L |
| "C" | 3.4 | 2.0 | 1.0 | Homogeneous liquid. | 0 | 2.10 | +13 | J |
| "D" | 3.4 | 2.4 | 1.0 | _____do_____ | 0 | 200 | +21 | J |

From the foregoing, the effect of the concentration of the glycol component in the composition of the product being prepared is evident.

EXAMPLE 3

Following the procedure of the first two examples, a series of homogeneous alkyl products were prepared from tall oil fatty acids, triethylene glycol, and chlorinated coal acids containing both 13.8 and 1.84 percent by weight of combined chlorine. The compositions of each of the products and certain of their characteristics, including results with coating compositions prepared therefrom in the indicated manner are set forth in the following tabulation.

Table 2

| Sample | Constituents | | | Percent Cl in ClCA | Acid No. of Liquid Product | Percent Completion of Reaction | Gardner Color of Alkyd in 5 percent Benzene Solution | Gardner Viscosity of Alkyd Product | Sward Hardness of Film | Drying Temp. of Film, °C. | Drying Time of Film, Hours |
|---|---|---|---|---|---|---|---|---|---|---|---|
| | Parts TOFA | Parts TEG | Parts ClCA | | | | | | | | |
| "E" | 44 | 44 | 13 | 13.8 | 46.5 | 70 | 9 | I | 4 | 115 | More than 4. |
| "F" | 44 | 44 | 13 | 1.84 | 53.8 | 67 | 8.5 | H | 4 | 115 | Do. |
| "G" | 40 | 40 | 20 | 13.8 | 58.5 | 68 | 11.5 | U | 4 | 115 | Do. |
| "H" | 40 | 40 | 20 | 1.84 | 61.2 | 70 | 9.5 | N | 4 | 115 | Do. |
| "J" | 37 | 37 | 26 | 13.8 | 74.5 | 66 | 13 | Z-4 | 20 | 115 | About 3. |

EXAMPLE 4

In general accordance with the foregoing procedure, another series of homogeneous alkyl products were prepared from tall oil fatty acids, triethylene glycol and chlorinated coal acids containing varying proportions of combined chlorine. The compositions of each of the alkyd products and the Gardner viscosities are presented in the tabulation.

Table 3

| Sample | Constituents | | | Percent Cl in ClCA | Equivalent Weight of Acid | Acid No. of Liquid Product | Percent Completion of Reaction | Gardner Viscosity of Alkyd Product |
|---|---|---|---|---|---|---|---|---|
| | Parts TOFA | Parts TEG | Parts ClCA | | | | | |
| "K" | 50 | 35 | 15 | 12.2 | 101 | 66 | 60 | N |
| "L" | 50 | 35 | 15 | 18.0 | 98 | 54 | 69 | G |
| "M" | 50 | 35 | 15 | 6.2 | 91 | 49.8 | 73 | I |
| "N" | 50 | 35 | 15 | 22.7 | 109 | 51.9 | 69 | F |
| "O" | 50 | 35 | 15 | 1.84 | 90 | 62.8 | 54 | E |
| "P" | 50 | 35 | 15 | 13.8 | 100 | 57.7 | 65 | F |
| "Q" | 50 | 35 | 15 | 7.14 | 109 | 57.7 | 65 | F |
| "R" | 50 | 35 | 15 | 13.7 | 96 | 60.6 | 65 | E |
| "S" | 52.5 | 31.8 | 15.8 | 13.8 | 100 | 71.5 | 50 | J |
| "T" | 50 | 35.0 | 15 | 13.8 | 100 | 40.5 | 62 | J |
| "U" | 52.5 | 31.8 | 15.8 | 13.8 | 100 | 35.3 | 81 | K |
| "V" | 48 | 33 | 19 | 13.8 | 100 | 125 | 38 | V |
| "W" | 45 | 32 | 23 | 13.8 | 100 | 155 | 28 | Y |
| "X" | 42 | 29 | 29 | 13.8 | 100 | 178 | 26 | Z-6 |

Excellent results may also be obtained when other oil-modified alkyd products are prepared with other chlorinated coal acids, other glycol constituents and other unsaturated fatty acids mixtures within the scope of the invention or when the above-indicated minor proportions of maleic anhydride or non-operative glycol constituents are utilized in the reaction mixtures.

What is claimed is:

1. An oil-modified alkyd composition comprised of the esterified product of reaction between (a) from 2 to 3 equivalents of a polyhydroxy glycol compound selected from the group consisting of liquid polyethylene glycols that contain at least three condensed ethylene oxide units in their molecules, liquid polypropylene glycols that contain at least two condensed polypropylene units in their molecules, liquid glycols and polyglycols that contain at least four carbon atoms in their molecules and have at least one secondary hydroxyl substituent group when they consist of less than 6 carbon atoms and mixtures thereof; (b) from about 0.1 to 1.80 equivalents of a monobasic unsaturated drying oil fatty acids mixture; and (c) from about 1.9 to 0.2 equivalents of chlorinated coal acids, said coal acids being the water-soluble mixed aromatic polycarboxylic acids that are the products of oxidation of carbonaceous materials, which have acids typically an average molecular weight of from 200 to 300, an apparent average equivalent weight of from 70 to 90 and contain an average of from 2.5 to 5 carboxylic groups per aromatic nucleus in their molecule, said chlorinated coal acids having a combined chlorine content between about 0.5 and 35 percent by weight.

2. The oil-modified alkyd composition of claim 1, wherein the halogenated coal acids contain between about 10 and 35 percent by weight of combined halogen.

3. The oil-modified alkyd composition of claim 2, wherein the halogenated coal acids contain at least about 17 percent by weight of combined halogen.

4. The oil-modified alkyd composition of claim 1, wherein the unsaturated fatty acids contain from 12 to 22 carbon atoms in their molecule.

5. The oil-modified alkyd composition of claim 1, wherein the unsaturated fatty acids are linseed oil fatty acids.

6. The oil-modified alkyd composition of claim 1, wherein the unsaturated fatty acids are soya bean oil fatty acids.

7. The oil-modified alkyd composition of claim 1, wherein the unsaturated fatty acids are tall oil fatty acids.

8. The oil-modified alkyd composition of claim 1, wherein the polyhydroxy compound is a liquid ethylene glycol.

9. The oil-modified alkyd composition of claim 1, wherein the polyhydroxy compound is triethylene glycol.

10. An oil-modified alkyd composition that is in accordance with that set forth in claim 1 and containing, in addition to the ingredients therein recited, between about 2 and 5 percent by weight of the total weight of ingredients of maleic anhydride.

11. An oil-modified alkyd composition in accordance with the composition set forth in claim 1 and containing, in addition to the ingredients therein recited and as part of said polyhydroxy constituent, up to about 0.6 equivalent of an additional polyhydroxy compound selected from the group consisting of glycerine, ethylene glycol, diethylene glycol, propylene glycol and their mixtures.

12. The oil-modified alkyd composition of claim 1, comprised of the esterified product of reaction between about 2.1 and 2.3 equivalents of said polyhydroxy compound; between about 1.8 and 0.8 equivalents of said halogenated coal acids and between about 0.3 and 1.2 equivalents of said fatty acids.

13. An oil-modified alkyd composition according to that set forth in claim 12, wherein the equivalent weight proportion of said polyhydroxy compound is an amount that is at least equal to the equivalent weight proportion of said acid constituents.

14. An oil-modified alkyd composition according to that set forth in claim 12, wherein the equivalent weight proportion of said polyhydroxy compound is an amount that is in excess by at least about 10 percent of the equivalent weight proportion of said acid constituents.

References Cited in the file of this patent

UNITED STATES PATENTS

| | | |
|---|---|---|
| 2,562,878 | Blair | Aug. 7, 1951 |
| 2,585,323 | Elwell et al. | Feb. 12, 1952 |